US006262221B1

(12) United States Patent
Palmer

(10) Patent No.: US 6,262,221 B1
(45) Date of Patent: Jul. 17, 2001

(54) POLYAMIDE RESIN COMPOSITION

(75) Inventor: Robert John Palmer, Geneva (CH)

(73) Assignee: E. I. duPont de Nemours and Company, Wilmington, DE (US)

( * ) Notice: Subject to any disclaimer, the term of this patent is extended or adjusted under 35 U.S.C. 154(b) by 0 days.

(21) Appl. No.: 08/807,042

(22) Filed: Feb. 25, 1997

Related U.S. Application Data

(63) Continuation of application No. 08/711,635, filed on Sep. 10, 1996, now abandoned.
(60) Provisional application No. 60/003,719, filed on Sep. 13, 1995.

(51) Int. Cl.$^7$ .......................... C08G 69/02; C08G 69/44; C08L 77/00
(52) U.S. Cl. .......................... 528/310; 528/322; 525/419; 524/538; 524/539; 524/556; 524/558; 524/559; 524/569; 524/606; 428/357; 428/364; 428/394; 428/395
(58) Field of Search .............................. 525/419; 528/310, 528/322; 524/538, 539, 556, 558, 559, 569, 606; 428/357, 364, 394, 395

(56) References Cited

U.S. PATENT DOCUMENTS

| | | | |
|---|---|---|---|
| 4,788,244 | * 11/1988 | Nakashashi et al. | 524/469 |
| 5,030,710 | * 7/1991 | Speranza et al. | 528/324 |
| 5,166,247 | * 11/1992 | Takatori et al. | 524/377 |
| 5,207,964 | * 5/1993 | Mauro | 264/221 |
| 5,243,933 | * 9/1993 | Mykawa | 123/52 M |
| 5,542,711 | * 8/1996 | Vandry | 285/41 |
| 5,543,452 | * 8/1996 | Nakahashi et al. | 524/430 |
| 5,731,375 | * 3/1998 | Park et al. | 524/405 |
| 5,874,146 | * 2/1999 | Kagan et al. | 428/57 |
| 5,980,777 | * 11/1999 | Umetsu et al. | 252/299.01 |

* cited by examiner

Primary Examiner—P. Hampton-Hightower

(57) ABSTRACT

An improved polyamide resin composition for weldable molded articles which comprises:

(a) 99.9–30% by weight of a polyamide-containing compound;
(b) 0.1–20% by weight of a plasticizing compound selected from the group consisting of esters of low molecular weight poly(ethylene glycol) having the formula (I)

R—COO—(CH$_2$CH$_2$O)$_n$—OC—R     (I)

wherein R is a branched or straight chain alkyl group having from 1 to 40 carbon atoms, and n is 2 to 20; or a long chain alkyl polyester of formula (II)

HOOC—R—CO—(O—R'—O—CO—R—CO)$_n$—O—R'—OH     (II)

wherein R is alkyl of 16 to 45 carbon atoms, R' is alkyl of 2 to 6 carbon atoms, or, wherein R is an alkyl of 2 to 6 carbon atoms, R' is an alkyl of 16 to 45 carbon atoms, and n is 2 to 50.

5 Claims, No Drawings

POLYAMIDE RESIN COMPOSITION

This application is a continuation-in-part of co-pending U.S. application Ser. No. 08/711,635, filed Sep. 10, 1996, abandoned which, in turn, claims the benefit of U.S. Provisional Application No. 60/003,719, filed Sep. 13, 1995, abandoned.

BACKGROUND OF THE INVENTION

1. Field of the Invention

The invention relates to an improved polyamide resin composition which includes from 0.1 to 20% by weight of a plasticising compound and to moulded hollow articles, which exhibit improved strength, i.e., burst pressure, that are produced by welding together discreet sections comprising said polyamide resin composition.

2. Description of Prior Art

It is known in the art to prepare polyamide-containing resin compositions from which moulded articles can be manufactured. Sometimes the requirements for the geometric shape of the moulded articles exceed the technical capabilities for moulding such an article in one piece or the moulding can only be carried out using a relatively costly and slow lost-core moulding process. As a result, alternative manufacturing processes have been developed to enable relatively complex-formed articles to be produced by first moulding parts of the article, for instance two half shells of a hollow article, and in a second step welding the shells together to form the desired article.

Difficulties have sometimes been encountered, however, in manufacturing articles with a sufficient strength to withstand the forces encountered in the utilization of such welded articles. A typical example is with air inlet manifolds for the automotive industry. In particular, weld failure can be a problem in applications where the welded article is subjected to an elevated internal pressure. This can happen, for example, when the article is an air intake manifold on an internal combustion engine, and the engine backfires.

An additional problem to overcome, besides that of weld failure is that in many cases the addition of compounds to the thermoplastic resin composition intended to increase the strength of a weld in the final article, may lead instead to a decrease in some other important property of the moulded article.

Surprisingly, it has now been found that including a specific weight percentage of a plasticising compound in polyamide resin compositions used for weldable moulded articles results in a significantly increased strength (as defined hereinafter), with minimal effect on other properties.

SUMMARY OF THE INVENTION

The present invention relates to an improved polyamide resin composition for weldable moulded articles, especially hollow articles, which comprises:

(a) from 99.9–30% by weight of a polyamide-containing compound, (b) from 0.1–20% by weight of a plasticising compound selected from the group consisting of esters of low molecular weight poly(ethylene glycol) having the formula (I)

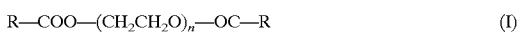

wherein R is a branched or straight chain alkyl group having from 1 to 40 carbon atoms, and n is 2 to 20; or a long chain alkyl polyester of formula (II)

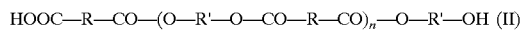

wherein R is alkyl of 16 to 45 carbon atoms, R' is alkyl of 2 to 6 carbon atoms, or, wherein R is an alkyl of 2 to 6 carbon atoms, R' is an alkyl of 16 to 45 carbon atoms, and n is 2 to 50, and (c) the balance of the composition up to 100% being selected from one or more additive compounds.

According to another aspect, the invention is an improvement in a polyamide-containing resin composition for weldable moulded articles, wherein the improvement comprises incorporating into said polyamide-containing resin composition an effective amount of a plasticising compound selected from the group consisting of esters of low molecular weight poly(ethylene glycol) having the formula (I)

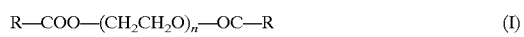

wherein R is a branched or straight chain alkyl group having from 1 to 40 carbon atoms, and n is 2 to 20; or a long chain alkyl polyester of formula (II)

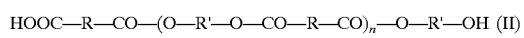

wherein R is alkyl of 16 to 45 carbon atoms, R' is alkyl of 2 to 6 carbon atoms, or, wherein R is an alkyl of 2 to 6 carbon atoms, R' is an alkyl of 16 to 45 carbon atoms, and n is 2 to 50.

According to yet another aspect, the present invention is a method for improving the weld strength of shaped articles where the articles are hollow and formed from discreet sections welded together and the sections consist essentially of a polyamide resin composition which contains an effective amount of a plasticising compound selected from the group consisting of esters of low molecular weight poly (ethylene glycol) having the formula (I)

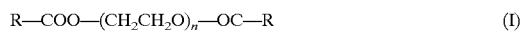

wherein R is a branched or straight chain alkyl group having from 1 to 40 carbon atoms, and n is 2 to 20; or a long chain alkyl polyester of formula (II)

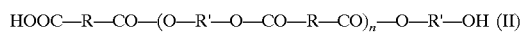

wherein R is alkyl of 16 to 45 carbon atoms, R' is alkyl of 2 to 6 carbon atoms, or, wherein R is an alkyl of 2 to 6 carbon atoms, R' is an alkyl of 16 to 45 carbon atoms, and n is 2 to 50.

According to yet another aspect, the present invention is a hollow article consisting essentially of a polyamide resin, the article being comprised of two or more discreet shaped sections welded together, wherein the polyamide resin contains from 0.1 to 20% by weight of a plasticising compound selected from the group consisting of esters of low molecular weight poly(ethylene glycol) having the formula (I)

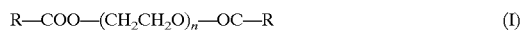

wherein R is a branched or straight chain alkyl group having from 1 to 40 carbon atoms, and n is 2 to 20; or a long chain alkyl polyester of formula (II)

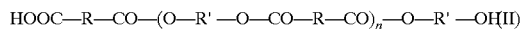

wherein R is alkyl of 16 to 45 carbon atoms, R' is alkyl of 2 to 6 carbon atoms, or, wherein R is an alkyl of 2 to 6 carbon atoms, R' is an alkyl of 16 to 45 carbon atoms, and n is 2 to 50.

In a preferred embodiment of the invention, the moulded article is an air intake manifold for an internal combustion engine, the polyamide resin composition is polyamide 6/6, and the plasticising compound is present in an amount of from 0.5 to 5% by weight and is a 2-ethyl hexanoic acid terminated low molecular weight poly(ethylene glycol), i.e., n=9, or a polyester formed from the reaction of a $C_{36}$ dicarboxylic acid and a glycol.

DETAILED DESCRIPTION

The addition of plasticisers to polyamides for improving properties has been known in the art for a long time. A plasticiser is a material which causes a reduction in the glass transition temperature (Tg) of the polyamide. If the Tg is reduced to below the temperature at which the modulus is measured, then the modulus will be significantly reduced. Water is an effective plasticiser for polyamides but organic plasticiser molecules can be added during manufacture to avoid moisture conditioning, or give a greater plasticising effect. Plasticisers are typically added at a level of 5% or greater to give a significant increase in flexibility. This increase in flexibility (reduction in energy necessary to deform the material) results in a reduction in the strength of the product (energy necessary to deform the material to breaking point).

Typically the strength of a moulded thermoplastic article is measured by one method as "Tensile Strength"; this is a measure of the maximum specific energy which can be applied to an appropriately moulded test piece before it breaks or yields.

It is to be expected that for plasticiser-containing polyamide compositions with increased flexibility the tensile strength will be reduced for the reasons given above.

This expected behavior would most likely have a negative effect on other methods of measuring strength, in particular for welded thermoplastic hollow objects, the burst pressure.

Burst pressure is determined by moulding the sections of an article with a thermoplastic resin composition and then welding the sections, usually two pieces, together, thus forming an enclosed hollow article such as in the shape of an air intake, or inlet, manifold. The resulting article is sealed and then pressurized until failure occurs at the weld; the failure pressure is recorded in bars. The test has become accepted in the automotive industry as a criterion for material selection for welded thermoplastic articles and is intended to indicate PERFORMANCE of a material in a welded automotive component such as an air inlet manifold when subjected to a sudden and intense internal pressure, such as occurs during a back fire in an internal combustion engine. This test will involve a tensile stress on the part, increasing to failure and would be expected to vary in a similar way to tensile strength.

Surprisingly, it has now been found that the burst pressure of welded hollow articles moulded from the polyamide-containing compositions according to the present invention is significantly increased when even a relatively small amount of plasticising compound is present in the resin composition.

The unexpected behavior of such compositions provides a technical solution to the aforementioned problems which could significantly increase the use of thermoplastic resins in environments where stringent requirements are imposed on the behavior of complex shaped welded articles.

The polyamide-containing compound may comprise polyamides, copolymers of amides and/or other monomers, blends of different polyamides, blends of polyamides with other thermoplastic polymers and/or blends of the aforementioned copolymers with a polyamide and/or blends of different copolymers with or without other thermoplastic polymers.

Preferably, the polyamide-containing compound is selected from the group consisting of the polyamides 6, 6/6, 4/6, semi-aromatic or aromatic polyamides, copolymers containing such polyamides and blends containing such polyamides.

In a particularly preferred embodiment of the present invention the polyamide is polyamide 6/6 because addition of a relatively small amount of plasticiser results in a thermoplastic resin composition with a substantially increased strength measured as burst pressure. Polyamide 6/6 is especially advantageous for use in applications such as automotive air intake manifolds due to its balance of properties including temperature and chemical stability.

The exceptional weld strength of moulded compositions comprising both plasticiser and reinforcement fibres (in particular glass fibres) is all the more surprising in view of the fact that such a significant increase can be achieved when a relatively small amount of a plasticising compound is present which otherwise confers very little change to the properties of the material. In such a case, tensile strength as well as other characteristic properties such as extensibility (elongation at break) are little changed compared to the increase in burst pressure.

The plasticising compound of the present invention is selected from the group consisting of esters of low molecular weight poly(ethylene glycol) having the formula (I)

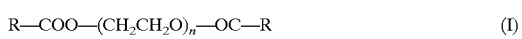

wherein R is a branched or straight chain alkyl group having from 1 to 40 carbon atoms, and n is 2 to 20; or a long chain alkyl polyester of formula (II)

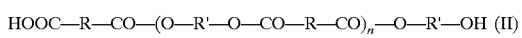

wherein R is alkyl of 16 to 45 carbon atoms, R' is alkyl of 2 to 6 carbon atoms, or, wherein R is an alkyl of 2 to 6 carbon atoms, R' is an alkyl of 16 to 45 carbon atoms, and n is 2 to 50.

A particularly preferred class of plasticising compounds includes 2-ethyl hexanoic acid terminated low molecular weight poly(ethylene glycol), i.e., where n=9, and long chain alkyl polyesters, in particular the polyester formed from the reaction of a $C_{36}$ dicarboxylic acid and a glycol.

The invention further relates to an improvement in a polyamide-containing resin composition, especially a polyamide 6/6 composition, for weldable moulded articles, wherein the improvement comprises incorporating into said polyamide-containing resin composition an effective amount of a plasticising compound selected from the group consisting of esters of low molecular weight poly(ethylene glycol) having the formula (I)

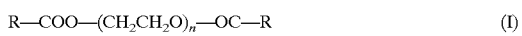

wherein R is a branched or straight chain alkyl group having from 1 to 40 carbon atoms, and n is 2 to 20; or a long chain alkyl polyester of formula (II)

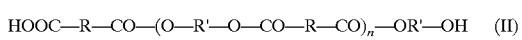

wherein R is alkyl of 16 to 45 carbon atoms, R' is alkyl of 2 to 6 carbon atoms, or, wherein R is an alkyl of 2 to 6 carbon atoms, R' is an alkyl of 16 to 45 carbon atoms, and n is 2 to 50.

According to yet another aspect, the present invention is a method for improving the weld strength of shaped articles where the articles are hollow and formed from discreet sections welded together and the sections consist essentially of a polyamide resin composition which contains an effective amount of a plasticising compound selected from the group consisting of esters of low molecular weight poly (ethylene glycol) having the formula (I)

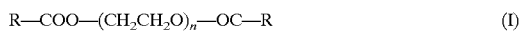

$$R-COO-(CH_2CH_2O)_n-OC-R \quad (I)$$

wherein R is a branched or straight chain alkyl group having from 1 to 40 carbon atoms, and n is 2 to 20; or a long chain alkyl polyester of formula (II)

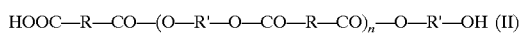

$$HOOC-R-CO-(O-R'-O-CO-R-CO)_n-O-R'-OH \quad (II)$$

wherein R is alkyl of 16 to 45 carbon atoms, R' is alkyl of 2 to 6 carbon atoms, or, wherein R is an alkyl of 2 to 6 carbon atoms, R' is an alkyl of 16 to 45 carbon atoms, and n is 2 to 50.

According to yet another aspect, the present invention is a hollow article consisting essentially of a polyamide resin, the article being comprised of two or more discreet shaped sections welded together, wherein the polyamide resin contains from 0.1 to 20% by weight of a plasticising compound selected from the group consisting of esters of low molecular weight poly(ethylene glycol) having the formula (I)

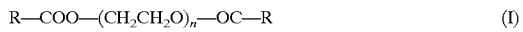

$$R-COO-(CH_2CH_2O)_n-OC-R \quad (I)$$

wherein R is a branched or straight chain alkyl group having from 1 to 40 carbon atoms, and n is 2 to 20; or a long chain alkyl polyester of formula (II)

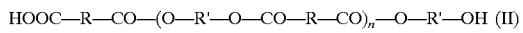

$$HOOC-R-CO-(O-R'-O-CO-R-CO)_n-O-R'-OH \quad (II)$$

wherein R is alkyl of 16 to 45 carbon atoms, R' is alkyl of 2 to 6 carbon atoms, or, wherein R is an alkyl of 2 to 6 carbon atoms, R' is an alkyl of 16 to 45 carbon atoms, and n is 2 to 50.

In a preferred embodiment of the invention, the moulded article is an air intake manifold for an internal combustion engine, the polyamide resin composition is polyamide 6/6, and the plasticising compound is present in an amount of from 0.5 to 5% by weight and is a 2-ethyl hexanoic acid terminated low molecular weight poly(ethylene glycol), i.e., where n=9, which is available commercially as Plasthall® 809 (C. P. Hall) and Uniplex® 809 (Unitex). The plasticising compound can also be a polyester formed from the reaction of a $C_{36}$ dicarboxylic acid and a glycol, an examples of which is available commercially as Priplast® 3155 (Unichema International). Other moulded articles which can be produced from the polyamide-containing composition of the invention include automotive components, electrical and electronic components, aerospace components, applications in sports- and leisure articles, in household- and technical, appliances, and in the building industry.

Preferably the polyamide resin composition according to the invention consists essentially of:

(a) from 99.5–60% by weight of polyamide 6/6, (b) from 0.5–10% by weight of a plasticising compound selected from a 2-ethyl hexanoic acid terminated low molecular weight poly(ethyleneglycol), where n=9, and a polyester formed from the reaction of a $C_{36}$ dicarboxylic acid and a glycol, and optionally, (c) from 20–40% by weight of a reinforcing compound, and (d) from 1–30% by weight of one or more additive compounds.

Most preferably the plasticising compound is present in the composition in an amount of from 0.5–5% by weight, in particular when the composition, comprises polyamide 6/6 as at least the major component of the polyamide-containing compound.

An amount of less than 0.5% by weight of plasticising compound in the resin does in many instances not result in a technically acceptable strength of welded articles moulded with the use of such resin, although smaller amounts can lead to an increase in strength (measured as burst pressure).

An amount of more than 5% by weight of plasticising compound can lead to undesired changes in properties of the thermoplastic resin composition, in particular, for technically demanding applications such as air inlet manifolds where the correct balance of properties of welded thermoplastic moulded sections is especially critical.

Various types of reinforcing compounds can be used in the thermoplastic resin compositions according to the invention, e.g. minerals (such as talc wollastonite, kaolin), and fibers. A wide variety of fibers can be used, both with respect to their dimensions and their chemical composition.

Suitable dimensions for the fibers depend strongly on the type of application of the resin. However, in many applications fibers with an average aspect ratio (ratio of length to diameter) in the moulding resin of between 5 and 100 and a diameter of between 1 and 20 microns are suitable.

Suitable types of fibers include both natural and man-made fibres, such as carbon, mineral, polymer- and glass fibers. Suitable polymer fibers are polyaramid fibers.

Particularly preferred fibers for welded articles with a high strength are glass fibers. The fibers may be coated with e.g. a silane compound in order to improve their adhesion to the resin composition.

The additive compounds referred to under (d) of a preferred thermoplastic resin composition according to the invention as described hereinabove can be one or more optional compounds selected from a wide variety of compounds tailored for different applications of the resin compositions.

Typically, additive compounds can include flame retardants, impact modifiers, pigments, lubricants, antioxidants and UV- and other stabilizers.

Various welding techniques for moulded articles made from plasticised polyamide resins of the type described herein exist, such as: hot plate-, inductance (emaweld)-, resistance(tapeweld)-, rotation-, angular-, ultrasonic-, and vibration-welding. While all these welding techniques have their advantages (and disadvantages), it has been found that complex-shaped moulded sections made of a plasticised polyamide resin composition according to the invention are very effectively welded employing a vibration welding technique.

The invention therefore also related to vibration-welded articles comprising at least two sections moulded from a thermoplastic resin composition as described hereinbefore.

The invention is illustrated by the following Examples.

EXAMPLE 1

Thermoplastic resin composition A (according to the invention) comprises 66.96% by weight of polyamide 6/6, 2.0% by weight of a plasticising compound (2-ethyl hexanoic acid terminated low molecular weight poly(ethylene glycol), where n=9), 30% by weight of glass fibers with an average length of 3 mm and an average diameter of 10 microns, 0.54% by weight of stabilizer and 2.0% by weight of a master batch containing black colorant.

Thermoplastic resin composition B (comparative example; not according to the invention) comprises 68.96% by weight of the same type of polyamide 6/6 present in composition A, no plasticiser, 30% by weight of the same type of glass fibers, 0.54% by weight of stabilizer and 2.0% by weight of a master batch containing black colorant.

The thermoplastic resin compositions A and B were both moulded into two sections of an identical test box which sections were subsequently joined together by vibration welding.

Pressure was applied internally to the test box by means of drilling a hole inserting a connection and pressurizing with oil using a pump connected to a pressure measuring device. The pressure at which the assembly burst was recorded.

Boxes were welded dry after moulding and left one day to equilibrate before burst testing.

The following table provides the results of the tests.

TABLE 1

| Exp. No. | Composition | Burst Pressure (bar) | Standard Deviation (bar) | Tensile Strength (MPa) | Elongation at Break (%) |
|---|---|---|---|---|---|
| 1 | A | 11.6 | 0.40 | 196 | 3.4 |
| 2 | B | 8.5 | 0.48 | 208 | 3.3 |

As shown in the table, the standard deviation for the burst pressure test is significantly lower than the substantial difference in burst pressure strength between Experiment 1 according to the invention and comparative Experiment 2.

The experimental results furthermore show that neither the test results for "Tensile Strength" or "Elongation at break" are an appropriate indication of the significantly increased strength in practical terms for applications where sudden pressure increases can occur in welded articles according to the invention, in particular air inlet manifolds for internal combustion engines.

EXAMPLE 2

Formulations as for Example 1 except that the plasticiser in composition C (according to the invention) is 2% of a polyester formed from the reaction of a $C_{36}$ dicarboxylic acid and a glycol.

TABLE 2

| Exp. No. | Composition | Burst Pressure (bar) | Tensile Strength (MPa) | Elongation at Break (%) |
|---|---|---|---|---|
| 3 | C | 11.5 | 198.5 | 3.4 |
| 4 | B | 8.5 | 208 | 3.3 |

Similar Formulations are used as for Example 1 employing the same type of plasticiser but with lower plasticiser contents and wherein compositions D and E are according to the invention.

TABLE 3

| Exp. No. | Composition | Plasticiser Content (wt. %) | Burst Pressure (bar) | Tensile Strength (MPa) | Elongation at Break (%) |
|---|---|---|---|---|---|
| 4 | B | 0 | 8.5 | 208 | 3.3 |
| 5 | D | 0.5 | 10.5 | 202.6 | 3.4 |
| 6 | E | 1.0 | 11.0 | 195.8 | 3.4 |

EXAMPLE 4

Composition F (according to the invention) comprises 53.21% by weight of a copolymer of polyamide 6/6 and polyamide 6 (85:15 ratio by weight), 15.0% by weight of polyamide 6, 2.0% by weight of a plasticising compound (2-ethyl hexanoic acid terminated low molecular weight poly(ethylene glycol), where n=9), 30% by weight of the same type of glass fibres as above, 1.25% of a master batch containing black colorant and 0.54% of stabilizer.

Composition G (comparative example; not according to the invention) comprises 51.21% by weight of the same copolymer as F, 15.0% by weight of the same type of polyamide 6, no plasticiser, 30% by weight of the same type of glass fibres, 1.25% of a master batch containing black colorant and 0.54% of stabilizer.

TABLE 4

| Exp. No. | Composition | Burst Pressure (bar) | Tensile Strength (MPa) | Elongation at Break (%) |
|---|---|---|---|---|
| 7 | F | 11.0 | 183.5 | 3.3 |
| 8 | G | 5.7 | 194.7 | 3.7 |

Composition H (according to the invention) comprises 95.46% by weight of polyamide 6/6, 2.0% by weight of a plasticising compound (2-ethyl hexanoic acid terminated low molecular weight poly(ethylene glycol), where n=9), 0.54% by weight of stabilizer and 2.0% by weight of a master batch containing black colorant.

Composition I (comparative example; not according to the invention) comprises 97.46% by weight of the same type of polyamide 6/6, no plasticiser, 0.54% stabilizer and 2.0% of a masterbatch containing black colorant.

Compositions H and I do not contain reinforcing compounds such as glass fiber.

TABLE 5

| Exp. No. | Composition | Burst Pressure (bar) | Tensile Strength (MPa) | Elongation at Break (%) |
|---|---|---|---|---|
| 9 | H | 8.1 | 79.8 | 4.4 |
| 10 | I | 4.5 | 88.5 | 4.0 |

Note that this Example Elongation at yield is provided whereas in Examples 1–4 Elongation at break is provided. For properties of unreinforced resin compositions such as H and I the former usually quoted whereas for reinforced materials the latter is normally used.

What is claimed is:

1. An improved polyamide resin composition for weldable moulded articles which comprises:
   (a) 99.9–30% by weight of a polyamide-containing compound;

(b) 0.1–20% by weight of a plasticising compound selected from the group consisting of esters of low molecular weight poly(ethylene glycol) having the formula (I)

$$R\text{—}COO\text{—}(CH_2CH_2O)_n\text{—}OC\text{—}R \quad (I)$$

wherein R is a branched or straight chain alkyl group having from 1 to 40 carbon atoms, and n is 2 to 20; or a long chain alkyl polyester of formula (II)

$$HOOC\text{—}R\text{—}CO\text{—}(O\text{—}R'\text{—}O\text{—}CO\text{—}R\text{—}CO)_n\text{—}O\text{—}R'\text{—}OH \quad (II)$$

wherein R is alkyl of 16 to 45 carbon atoms, R' is alkyl of 2 to 6 carbon atoms, or, wherein R is an alkyl of 2 to 6 carbon atoms, R' is an alkyl of 16 to 45 carbon atoms, and n is 2 to 50, and (c) the balance of the composition up to 100% being selected from one or more additive compounds.

2. An improvement in a polyamide-containing resin composition for weldable moulded articles, wherein the improvement comprises incorporating into said polyamide-containing resin composition an effective amount of a plasticising compound selected from the group consisting of esters of low molecular weight poly(ethylene glycol) having the formula (I)

$$R\text{—}COO\text{—}(CH_2CH_2O)_n\text{—}OC\text{—}R \quad (I)$$

wherein R is a branched or straight chain alkyl group having from 1 to 40 carbon atoms, and n is 2 to 20; or a long chain alkyl polyester of formula (II)

$$HOOC\text{—}R\text{—}CO\text{—}(O\text{—}R'\text{—}O\text{—}CO\text{—}R\text{—}CO)_n\text{—}O\text{—}R'\text{—}OH \quad (II)$$

wherein R is alkyl of 16 to 45 carbon atoms, R' is alkyl of 2 to 6 carbon atoms, or, wherein R is an alkyl of 2 to 6 carbon atoms, R' is an alkyl of 16 to 45 carbon atoms, and n is 2 to 50.

3. A method for improving the weld strength of shaped articles where the articles are hollow and formed from discreet sections welded together and the sections consist essentially of a polyamide resin composition which contains an effective amount of a plasticising compound selected from the group consisting of esters of low molecular weight poly(ethylene glycol) having the formula (I)

$$R\text{—}COO\text{—}(CH_2CH_2O)_n\text{—}OC\text{—}R \quad (I)$$

wherein R is a branched or straight chain alkyl group having from 1 to 40 carbon atoms, and n is 2 to 20; or a long chain alkyl polyester of formula (II)

$$HOOC\text{—}R\text{—}CO\text{—}(O\text{—}R'\text{—}O\text{—}CO\text{—}R\text{—}CO)_n\text{—}O\text{—}R'\text{—}OH \quad (II)$$

wherein R is alkyl of 16 to 45 carbon atoms, R' is alkyl of 2 to 6 carbon atoms, or, wherein R is an alkyl of 2 to 6 carbon atoms, R' is an alkyl of 16 to 45 carbon atoms, and n is 2 to 50.

4. A hollow article consisting essentially of a polyamide resin, the article being comprised of two or more discreet shaped sections welded together, wherein the polyamide resin contains from 0.1 to 20% by weight of a plasticising compound selected from the group consisting of esters of low molecular weight poly(ethylene glycol) having the formula (I)

$$R\text{—}COO\text{—}(CH_2CH_2O)_n\text{—}OC\text{—}R \quad (I)$$

wherein R is a branched or straight chain alkyl group having from 1 to 40 carbon atoms, and n is 2 to 20; or a long chain alkyl polyester of formula (II)

$$HOOC\text{—}R\text{—}CO\text{—}(O\text{—}R'\text{—}O\text{—}CO\text{—}R\text{—}CO)_n\text{—}O\text{—}R'\text{—}OH \quad (II)$$

wherein R is alkyl of 16 to 45 carbon atoms, R' is alkyl of 2 to 6 carbon atoms, or, wherein R is an alkyl of 2 to 6 carbon atoms, R' is an alkyl of 16 to 45 carbon atoms, and n is 2 to 50.

5. An air intake manifold for an internal combustion engine, the polyamide resin composition is polyamide 6/6, and the plasticising compound is present in an amount of from 0.5 to 5% by weight and is 2-ethyl hexanoic acid terminated low molecular weight poly(ethylene glycol) or a long chain polyester formed from the reaction of a $C_{36}$ dicarboxylic acid and a glycol.

\* \* \* \* \*